Figure 1:
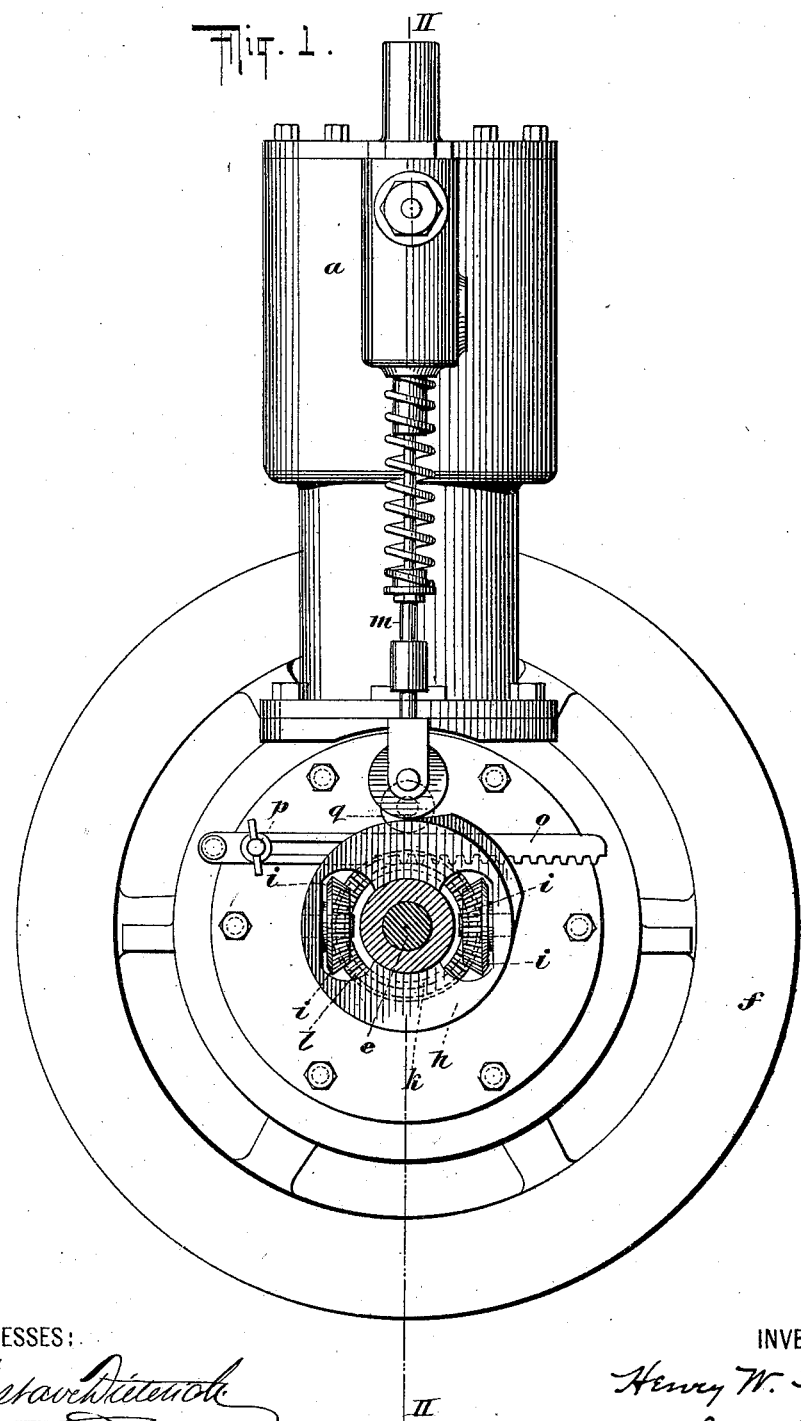

No. 663,106. Patented Dec. 4, 1900.
H. W. STRUSS.
EXPLOSION ENGINE.
(Application filed Dec. 8, 1899.)

(No Model.) 2 Sheets—Sheet 1.

WITNESSES:

INVENTOR
Henry W. Struss
BY
ATTORNEYS

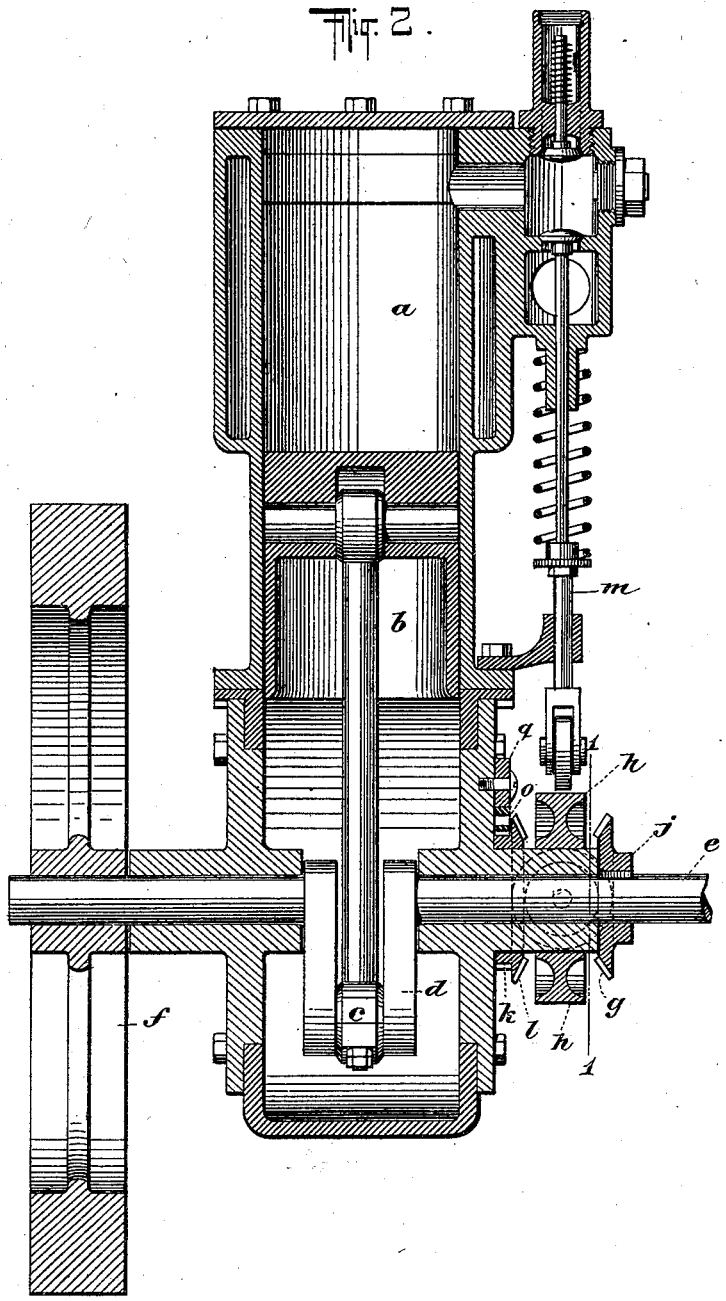

UNITED STATES PATENT OFFICE.

HENRY W. STRUSS, OF NEW YORK, N. Y.

EXPLOSION-ENGINE.

SPECIFICATION forming part of Letters Patent No. 663,106, dated December 4, 1900.

Application filed December 8, 1899. Serial No. 739,732. (No model.)

*To all whom it may concern:*

Be it known that I, HENRY W. STRUSS, a citizen of the United States, residing in the borough of Manhattan, city, county, and State of New York, have invented certain new and useful Improvements in Explosion-Engines, of which the following is a specification.

My invention relates to explosion-engines, and has for its object to produce a means for controlling the said engine from a rotating part thereof.

In the accompanying drawings I have shown a gas-engine in which my invention is embodied, it being understood, however, that my invention is not limited to the construction shown nor to the idea of controlling gas-engines only.

In the accompanying drawings, Figure 1 is a side elevation, partly in section, of an engine embodying my invention; and Fig. 2 is a section of Fig. 1 on the line II II thereof, the said figure likewise showing the line I I upon which the section of Fig. 1 is taken.

In the drawings, $a$ is a suitable cylinder, and $b$ a suitable piston working therein, whose rod $c$ is connected to a crank $d$ upon the main shaft of the engine. This main shaft of the engine projects outside of the engine-casing and is provided with a fly-wheel $f$. The shaft $e$ passes freely through a stationary sleeve $g$, upon which is hung a freely-rotatable cam $h$. This cam $h$ is recessed and is shown as provided with a plurality of traveling bevel pinions or gears $i$, which are carried upon and rotate freely upon pintles carried by the cam. The term "traveling" is here used in the sense of a bodily movement of translation as contradistinguished from a mere rotation of the pinions on their axes. A rotating or movable bevel-gear $j$ is shown as keyed to the shaft $e$ and meshes with the bevel-pinions $i$. The sleeve $g$ likewise carries a freely-movable gear or sleeve $k$, which carries a normally stationary bevel-gear $l$, which meshes with the bevel-pinions $i$ of the cam-wheel. A suitable exhaust-valve rod $m$ or other controlling part is operated by the cam $h$ after the normal manner of an explosion-engine. The gear $k$ is normally held stationary by a rack $o$, which meshes therewith and which may be rigidly, but adjustably, held in place on the engine-casing by a set-screw $p$ or other suitable device, which will be readily understood by those skilled in the art. A suitable roller $q$, carried upon a stud in the engine-casing, serves to guide the rack $o$.

The operation of the construction shown in the drawings is as follows: The rotation of the crank-shaft $e$ causes the cam $h$, through the medium of its epicyclic train of gears $i\ j\ l$, to rotate once during every two revolutions of the crank-shaft $e$. When it is desired to reverse the engine, the said screw $p$ may be loosened and the rack $o$ given a longitudinal movement to move the cam $h$. It will be obvious that other means may be employed to move the cam to effect the reversal.

Having described my invention, what I claim, and desire to secure by Letters Patent, is—

1. In an explosion-engine, the combination of a governing-valve, a shaft a cam for operating the governing-valve and an epicyclic gear for rotating the cam comprising in its structure a traveling wheel or gear $i$ for rotating the cam and a fixed gear $l$ and a rotatable gear carried by the shaft and engaging with the said traveling wheel or gear.

2. In an explosion-engine, the combination of a governing-valve, a shaft a cam for operating the governing-valve and an epicyclic train for rotating the cam comprising in its structure a traveling wheel or gear for rotating the cam and an adjustable gear fixed upon some stationary part of the engine and a rotatable gear carried by the shaft engaging with the said traveling wheel or gear and means for adjusting the adjustable gear to shift the cam to effect a reversal of the engine.

3. In an explosion-engine, the combination of a suitable main shaft, a valve for governing the exhaust from the cylinder, a cam $h$ for operating the exhaust-valve and provided with a bevel-gear and means for driving the said cam, comprising a stationary gear fixed to the frame of the engine and meshing with the gear of the cam and a rotatable gear likewise meshing therewith and driven from the main shaft of the engine, substantially as described.

HENRY W. STRUSS.

Witnesses:
GEO. E. MORSE,
OTTO V. SCHRENK.